(12) United States Patent
Czaplicki et al.

(10) Patent No.: US 6,474,723 B2
(45) Date of Patent: Nov. 5, 2002

(54) HEAT ACTIVATED REINFORCING SLEEVE

(75) Inventors: Michael J. Czaplicki, Rochester, MI (US); Eric Le Gall, Strasbourg (FR); Berndt Eckman, Henan (CH)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 09/982,681

(22) Filed: Oct. 18, 2001

(65) Prior Publication Data

US 2002/0027379 A1 Mar. 7, 2002

Related U.S. Application Data

(62) Division of application No. 09/524,961, filed on Mar. 14, 2000.

(51) Int. Cl.[7] .................................................. B60J 7/00
(52) U.S. Cl. ................... 296/188; 296/205; 296/203.03
(58) Field of Search ................................ 296/188, 189, 296/194, 203.03, 30, 205; 428/36.91

(56) References Cited

U.S. PATENT DOCUMENTS

| 1,814,677 A | 5/1930 | Fennema |
| 3,054,636 A | 9/1962 | Wessells, III |
| 3,123,170 A | 3/1964 | Bryant |
| 3,649,375 A | 1/1970 | Venkatesan |
| 3,493,257 A | 2/1970 | Fitzgerald et al. |
| 3,665,968 A | 5/1972 | DePutter |
| 3,746,387 A | 7/1973 | Schwenk |
| 3,757,559 A | 9/1973 | Welsh |
| 3,868,796 A | 3/1975 | Bush |
| 3,890,108 A | 6/1975 | Welsh |
| 4,019,301 A | 4/1977 | Fox |
| 4,029,128 A | 6/1977 | Yamagishi |
| 4,082,825 A | 4/1978 | Puterbaught |
| 4,083,384 A | 4/1978 | Horne et al. |
| 4,090,734 A | 5/1978 | Inami et al. |
| 4,238,540 A | 12/1980 | Yates et al. |
| 4,378,395 A | 3/1983 | Asoshima et al. |

(List continued on next page.)

FOREIGN PATENT DOCUMENTS

| AT | 0 236 291 | 9/1987 |
| DE | 2919046 | 5/1979 |
| DE | 3627725 A1 | 2/1988 |
| DE | G9011147.8 | 9/1990 |

(List continued on next page.)

OTHER PUBLICATIONS

Co–pending Application Serial No. 09/524,960, filed Mar. 14, 2000.
Co–pending Application Serial No. 09/428,243; filed Oct. 27, 1999.

(List continued on next page.)

*Primary Examiner*—Joseph D. Pape
(74) *Attorney, Agent, or Firm*—Dobrusin & Thennisch PC

(57) ABSTRACT

A reinforced sleeve including a carrier member and a reinforcing medium supported by the carrier member. The carrier is an elongated polymer member, and the reinforcing medium extends along at least a portion of the length of the carrier member. The reinforcing medium is preferably an epoxy-based resin. More particularly, the reinforcing medium is preferably a heat-activated structural foam.

20 Claims, 2 Drawing Sheets

U.S. PATENT DOCUMENTS

| | | |
|---|---|---|
| 4,397,490 A | 8/1983 | Evans, et al. |
| 4,440,434 A | 4/1984 | Celli |
| 4,457,555 A | 7/1984 | Draper |
| 4,463,870 A | 8/1984 | Coburn Jr., et al. |
| 4,559,274 A | 12/1985 | Kloppe et al. |
| 4,610,836 A | 9/1986 | Wycech |
| 4,613,177 A | 9/1986 | Loren et al. |
| 4,695,343 A | 9/1987 | Wycech |
| 4,705,716 A | 11/1987 | Tang |
| 4,732,806 A | 3/1988 | Wycech |
| 4,751,249 A | 6/1988 | Wycech |
| 4,762,352 A | 8/1988 | Enomoto |
| 4,769,391 A | 9/1988 | Wycech |
| 4,803,108 A | 2/1989 | Leuchten et al. |
| 4,813,690 A | 3/1989 | Coburn, Jr. |
| 4,836,516 A | 6/1989 | Wycech |
| 4,853,270 A | 8/1989 | Wycech |
| 4,861,097 A | 8/1989 | Wycech |
| 4,898,630 A | 2/1990 | Kitoh et al. |
| 4,901,395 A | 2/1990 | Semrau |
| 4,901,500 A | 2/1990 | Wycech |
| 4,908,930 A | 3/1990 | Wycech |
| 4,917,435 A | 4/1990 | Bonnett et al. |
| 4,922,596 A | 5/1990 | Wycech |
| 4,923,902 A | 5/1990 | Wycech |
| 4,946,737 A | 8/1990 | Lindeman et al. |
| 4,978,562 A | 12/1990 | Wycech |
| 4,984,406 A | 1/1991 | Friesen |
| 4,989,913 A | 2/1991 | Moore, III |
| 4,995,545 A | 2/1991 | Wycech |
| 5,040,803 A | 8/1991 | Cieslik et al. |
| 5,072,952 A | 12/1991 | Irrgeher et al. |
| 5,102,188 A | 4/1992 | Yamane |
| 5,122,398 A | 6/1992 | Seiler et al. |
| 5,124,186 A | 6/1992 | Wycech |
| 5,160,465 A | 11/1992 | Soderberg |
| 5,213,391 A | 5/1993 | Takagi |
| 5,255,487 A | 10/1993 | Wieting et al. |
| 5,266,133 A | 11/1993 | Hanley et al. |
| 5,344,208 A | 9/1994 | Bien et al. |
| 5,358,397 A | 10/1994 | Ligon et al. |
| 5,373,027 A | 12/1994 | Hanley et al. |
| 5,382,397 A | 1/1995 | Turner, Jr. |
| 5,395,135 A | 3/1995 | Lim et al. |
| 5,506,025 A | 4/1996 | Otto et al. |
| 5,560,672 A | 10/1996 | Lim et al. |
| 5,575,526 A | 11/1996 | Wycech |
| 5,577,784 A | 11/1996 | Nelson |
| 5,580,120 A | 12/1996 | Nees et al. |
| 5,642,914 A | 7/1997 | Takabatake |
| 5,648,401 A | 7/1997 | Czaplicki et al. |
| 5,649,400 A | 7/1997 | Miwa |
| 5,652,039 A | 7/1997 | Tremain et al. |
| 5,707,098 A | 1/1998 | Uchida et al. |
| 5,725,272 A | 3/1998 | Jones |
| 5,731,069 A | 3/1998 | Delle Donne et al. |
| 5,755,486 A | 5/1998 | Wycech |
| 5,766,719 A | 6/1998 | Rimkus |
| 5,785,376 A | 7/1998 | Nees et al. |
| 5,786,394 A | 7/1998 | Slaven |
| 5,803,533 A | 9/1998 | Schulz et al. |
| 5,804,608 A | 9/1998 | Nakazato et al. |
| 5,806,915 A | 9/1998 | Takabatake |
| 5,806,919 A | 9/1998 | Davies |
| 5,819,408 A | 10/1998 | Catlin |
| 5,851,626 A | 12/1998 | McCorry et al. |
| 5,855,094 A | 1/1999 | Baudisch et al. |
| 5,866,052 A | 2/1999 | Muramatsu |
| 5,871,849 A | 2/1999 | Lepine |
| 5,878,784 A | 3/1999 | Sales et al. |
| 5,884,960 A | 3/1999 | Wycech |
| 5,885,688 A | 3/1999 | McLaughlin |
| 5,888,600 A | 3/1999 | Wycech |
| 5,888,642 A | 3/1999 | Meteer et al. |
| 5,894,071 A | 4/1999 | Merz et al. |
| 5,901,528 A | 5/1999 | Richardson |
| 5,901,752 A | 5/1999 | Lundman |
| 5,902,656 A | 5/1999 | Hwang |
| 5,904,024 A | 5/1999 | Miwa |
| 5,932,680 A | 8/1999 | Heider |
| 5,934,737 A | 8/1999 | Abouzahr |
| 5,941,597 A | 8/1999 | Horiuchi et al. |
| 5,984,389 A | 11/1999 | Nuber |
| 5,985,435 A | 11/1999 | Czaplicki et al. |
| 5,988,734 A | 11/1999 | Longo et al. |
| 5,992,923 A | 11/1999 | Wycech |
| 5,994,422 A | 11/1999 | Born et al. |
| 6,003,274 A | 12/1999 | Wycech |
| 6,004,425 A | 12/1999 | Born et al. |
| 6,006,484 A | 12/1999 | Geissbuhler |
| 6,022,066 A | 2/2000 | Tremblay et al. |
| 6,033,300 A | 3/2000 | Schneider |
| 6,050,630 A | 4/2000 | Hochet |
| 6,053,210 A | 4/2000 | Chapman et al. |
| 6,058,673 A | 5/2000 | Wycech |
| 6,059,342 A | 5/2000 | Kawai et al. |
| 6,068,424 A | 5/2000 | Wycech |
| 6,073,991 A | 6/2000 | Naert |
| 6,077,884 A | 6/2000 | Hess et al. |
| 6,079,180 A | 6/2000 | Wycech |
| 6,082,811 A | 7/2000 | Yoshida |
| 6,090,232 A | 7/2000 | Seeliger et al. |
| 6,092,864 A | 7/2000 | Wycech et al. |
| 6,094,798 A | 8/2000 | Seeliger et al. |
| 6,096,403 A | 8/2000 | Wycech et al |
| 6,096,791 A | 8/2000 | Born et al. |
| 6,099,948 A | 8/2000 | Paver, Jr. |
| 6,102,379 A | 8/2000 | Ponslet et al. |
| 6,102,473 A | 8/2000 | Steininger et al. |
| 6,103,341 A | 8/2000 | Barz et al. |
| 6,103,784 A | 8/2000 | Hilborn et al. |
| 6,110,982 A | 8/2000 | Russick et al. |
| 6,129,410 A | 10/2000 | Kosararju et al. |
| 6,131,897 A | 10/2000 | Barz et al. |
| 6,135,542 A | 10/2000 | Emmelmann et al. |
| 6,146,565 A | 11/2000 | Keller |
| 6,149,227 A | 11/2000 | Wycech |
| 6,150,428 A | 11/2000 | Hanley, IV et al. |
| 6,152,260 A | 11/2000 | Eipper et al. |
| 6,153,709 A | 11/2000 | Xiao et al. |
| 6,165,588 A | 12/2000 | Wycech |
| 6,168,226 B1 | 1/2001 | Wycech |
| 6,174,932 B1 | 1/2001 | Pachl et al. |
| 6,189,953 B1 | 2/2001 | Wycech |
| 6,196,621 B1 | 3/2001 | Van Assche et al. |
| 6,197,403 B1 | 3/2001 | Brown et al. |
| 6,199,940 B1 | 3/2001 | Hopton et al. |
| 6,232,433 B1 | 5/2001 | Narayan |
| 6,233,826 B1 | 5/2001 | Wycech |
| 6,237,304 B1 | 5/2001 | Wycech |
| 6,247,287 B1 | 6/2001 | Takabatake |
| 6,253,524 B1 | 7/2001 | Hopton et al. |
| 6,263,635 B1 | 7/2001 | Czaplicki |
| 6,270,600 B1 | 8/2001 | Wycech |
| 6,272,809 B1 | 8/2001 | Wycech |
| 6,276,105 B1 | 8/2001 | Wycech |
| 6,277,898 B1 | 8/2001 | Pachl et al. |
| 6,281,260 B1 | 8/2001 | Hanley, IV et al. |
| 6,287,666 B1 | 9/2001 | Wycech |
| 6,296,298 B1 | 10/2001 | Barz |
| 6,303,672 B1 | 10/2001 | Papalos et al. |

| | | | |
|---|---|---|---|
| 6,305,136 B1 | 10/2001 | Hopton et al. | |
| 6,311,452 B1 | 11/2001 | Barz et al. | |
| 6,315,938 B1 | 11/2001 | Jandali | |
| 6,319,964 B1 | 11/2001 | Blank et al. | |
| 6,321,793 B1 | 11/2001 | Czaplicki et al. | |
| 6,332,731 B1 | 12/2001 | Wycech | |
| 6,341,467 B1 | 1/2002 | Wycech | |
| 6,348,513 B1 | 2/2002 | Hilborne et al. | |
| 6,368,438 B1 | 4/2002 | Chang et al. | |
| D457,120 S | 5/2002 | Broccardo et al. | |
| 2001/0020794 A1 | 9/2001 | Ishikawa | |
| 2002/0033617 A1 | 3/2002 | Blank | |
| 2002/0053179 A1 | 5/2002 | Wycech | |
| 2002/0054988 A1 | 5/2002 | Wycech | |
| 2002/0074827 A1 | 6/2002 | Fitzgerald et al. | |

FOREIGN PATENT DOCUMENTS

| | | |
|---|---|---|
| DE | G9320333.0 | 6/1994 |
| DE | 196 35 734 A1 | 4/1997 |
| DE | 2 749 263 | 12/1997 |
| DE | 196 44 047 A1 | 5/1998 |
| DE | 196 48 164 A1 | 5/1998 |
| DE | 198 12 288 C1 | 5/1999 |
| DE | 197 53 658 A1 | 6/1999 |
| DE | 299 04 705 U1 | 7/1999 |
| DE | 198 56 225 C1 | 1/2000 |
| DE | 19858903 A1 | 6/2000 |
| EP | 82102135.9 | 3/1982 |
| EP | 90202150.0 | 8/1990 |
| EP | 91104546.6 | 3/1991 |
| EP | 94101343.5 | 1/1994 |
| EP | 0 679 501 A1 | 11/1995 |
| EP | 0 775 721 A1 | 5/1997 |
| EP | 0 891 918 A1 | 1/1999 |
| EP | 0 893 331 A1 | 1/1999 |
| EP | 0 893 332 A1 | 1/1999 |
| EP | 1 122 156 A2 | 8/2001 |
| EP | 0 893 322 B1 | 3/2002 |
| FR | 2 539 693 | 1/1983 |
| FR | 2 539 693 | 7/1984 |
| FR | 2749263 A1 | 5/1996 |
| GB | 628863 | 3/1947 |
| GB | 8028960 | 9/1980 |
| GB | 2 156 412 A | 10/1985 |
| GB | 8725028 | 10/1987 |
| JP | 61118211 | 5/1986 |
| JP | 01164867 | 2/1989 |
| JP | 64-69308 | 3/1989 |
| JP | 64-69309 | 3/1989 |
| JP | 2-206537 | 8/1990 |
| JP | 5-38992 | 2/1993 |
| JP | 2001191947 | 7/2001 |
| JP | 2001191949 A | 7/2001 |
| WO | WO 87/01978 | 4/1987 |
| WO | PCT/JP88/00029 | 1/1988 |
| WO | PCT/AU92/00468 | 9/1992 |
| WO | PCT/EP95/00896 | 3/1995 |
| WO | WO 95/32110 | 11/1995 |
| WO | PCT/US96/11155 | 7/1996 |
| WO | PCT/US97/10693 | 6/1997 |
| WO | PCT/US97/07644 | 11/1997 |
| WO | PCT/US97/19981 | 11/1997 |
| WO | WP 98/36944 | 8/1998 |
| WO | PCT/US98/17994 | 9/1998 |
| WO | PCT/US98/08980 | 11/1998 |
| WO | PCT/US98/16461 | 2/1999 |
| WO | PCT/US99/00035 | 1/1999 |
| WO | PCT/US99/00770 | 1/1999 |
| WO | PCT/US99/01855 | 2/1999 |
| WO | PCT/US99/01865 | 2/1999 |
| WO | PCT/US99/04263 | 3/1999 |
| WO | PCT/US99/04279 | 3/1999 |
| WO | PCT/CA99/00424 | 5/1999 |
| WO | PCT/US99/10441 | 5/1999 |
| WO | PCT/US99/11109 | 5/1999 |
| WO | PCT/US99/11110 | 5/1999 |
| WO | PCT/US99/11194 | 5/1999 |
| WO | PCT/US99/11195 | 5/1999 |
| WO | PCT/EP99/03832 | 6/1999 |
| WO | WO 99/28575 | 6/1999 |
| WO | PCT/EP99/06112 | 8/1999 |
| WO | PCT/US99/18820 | 8/1999 |
| WO | PCT/EP99/07143 | 9/1999 |
| WO | PCT/US99/18832 | 9/1999 |
| WO | WO 99/48746 | 9/1999 |
| WO | PCT/US99/24795 | 10/1999 |
| WO | PCT/DE99/04103 | 12/1999 |
| WO | PCT/EP99/09541 | 12/1999 |
| WO | PCT/EP99/09732 | 12/1999 |
| WO | PCT/EP99/09909 | 12/1999 |
| WO | PCT/EP99/10151 | 12/1999 |
| WO | PCT/US99/29986 | 12/1999 |
| WO | PCT/US99/29987 | 12/1999 |
| WO | PCT/US99/29990 | 12/1999 |
| WO | PCT/US99/29991 | 12/1999 |
| WO | PCT/US99/29992 | 12/1999 |
| WO | PCT/US00/00010 | 1/2000 |
| WO | PCT/EP00/00021 | 1/2000 |
| WO | PCT/US00/00497 | 1/2000 |
| WO | PCT/US00/01644 | 1/2000 |
| WO | WO 00/03894 | 1/2000 |
| WO | PCT/EP00/01474 | 2/2000 |
| WO | PCT/US00/02631 | 2/2000 |
| WO | PCT/AT00/00123 | 5/2000 |
| WO | WO 00/37302 | 6/2000 |
| WO | WO 00/55444 | 9/2000 |
| WO | WO 01/54936 | 8/2001 |
| WO | WO 01/56845 | 8/2001 |
| WO | WO 01/57130 | 8/2001 |
| WO | WO 01/71225 | 9/2001 |
| WO | WO 01/83206 | 11/2001 |

OTHER PUBLICATIONS

Co–pending Application Serial No. 09/460,322; filed Dec. 10, 1999.

Co–pending Application Serial No. 09/459,756; filed Dec. 10, 1999.

Co–pending Application Serial No. 09/524,298; filed Mar. 14, 2000.

Co–pending Application Serial No. 09/502,686; filed Feb. 11, 2000.

Co–pending Application Serial No. 09/591,877; filed Jun. 12, 2000.

Co–pending Application Serial No. 09/631,211; filed Aug. 3, 2000.

Co–pending Application Serial No. 09/676,443; filed Sep. 29, 2000.

Co–pending Application Serial No. 09/676,335; filed Sep. 29, 2000.

Co–pending Application Serial No. 09/676,725; filed Sep. 29, 2000.

Copending U.S. Application Serial No. 09/858,939 filed May 16, 2001.

Copending U.S. Application Serial No. 09/859,126 filed May 16, 2001.

Copending U.S. Application Serial No. 09/906,289 filed Jul. 16, 2001.

Copending U.S. Application Serial No. 09/923,138 filed Aug. 6, 2001.

Copending U.S. Application Serial No. 09/939,152 filed Aug. 24, 2001.
Copending U.S. Application Serial No. 09/939,245 filed Aug. 24, 2001.
Copending U.S. Application Serial No. 09/974,017 filed Oct. 10, 2001.
Copending U.S. Application Serial No. 60/296,312 filed June 6, 2001.
Copending U.S. Application Serial No. 60/317,009 filed Sep. 4, 2001.
Copending U.S. Application Serial No. 09/584,211 filed May 31, 2000.
Copending U.S. Application Serial No. 09/655,965 filed Sep. 6, 2000.
International Search Report dated Sep. 7, 2001.

HEAT ACTIVATED REINFORCING SLEEVE

This application is a divisional of copending application: application Ser. No. 09/524,961 filed on Mar. 14, 2000.

FIELD OF THE INVENTION

This invention relates to a reinforced sleeve coupled to a frame assembly so as to increase the structural strength and stiffness of the frame at selected locations. More particularly, the invention relates to a sleeve coupled to the pillar portion of an automobile frame, wherein the sleeve supports a reinforcing medium that becomes chemically active and expands in response to a predetermined change in ambient conditions.

BACKGROUND OF THE INVENTION

For many years the automobile industry has been concerned with designing improved vehicle body structures that absorb or deflect impact loads imposed on the vehicle at or near the passenger compartment. While reinforcing the surfaces surrounding the vehicle passenger compartment has long been practiced in the automotive industry, often the structures used to reinforce the frame surrounding the passenger compartment include metal components. These metal reinforcement members tend to add unwanted weight to the automobile. In other instances, the reinforcing members include complex configurations that require welding or mechanical fasteners to affix the reinforcement member to the frame.

Consequently, there is needed a lightweight, easily installed apparatus for reinforcing the automobile frame structure, particularly in the area of the passenger compartment.

SUMMARY OF THE INVENTION

An object of the present invention is to define a reinforcing sleeve that enhances the capacity of an automobile frame assembly to dissipate energy from an impact load imposed on the vehicle frame to avoid deformation of the frame in special locations.

To accomplish this and other objects, there is provided a sleeve including a carrier and a reinforcing, medium supported by the carrier. The carrier is fabricated from a polymeric material, and includes an interior and exterior surface.

The reinforcing medium extends along at least a portion of the length of the exterior of the carrier. The reinforcing medium is an epoxy-based resin. Preferably the reinforcing medium is a heat-activated structural foam that expands upon heating, typically by a foaming reaction. The preferred reinforcing materials are structural foams available from L&L Products of Romeo, Mich. under the designations L5206, L5207, L5208 and L5209.

The sleeve is formed by (1) providing a carrier; (2) reinforcing the carrier by applying a reinforcing medium thereto; and (3) heating the reinforcing medium to a temperature sufficient to cause the reinforcing medium to expand and adhere to adjacent surfaces, either via a bonding formulation in the reinforcing medium itself or via a separate adhesive layer.

A general method for installing the sleeve in a frame member includes (1) providing a carrier having a hollow portion; (2) coupling the sleeve to the carrier; and (3) heating the energy absorbing medium to a temperature sufficient to cause the reinforcing medium to expand, such as via activation of a blowing agent.

In one embodiment, the sleeve is coupled to a pillar portion of an automobile frame. The sleeve is received in the hollow portion of the pillar frame, wherein the sleeve includes a carrier and an reinforcing medium supported by the carrier. The reinforcing medium extends along at least a portion of the length of the carrier, and becomes chemically activated upon heating the foam to its thermal activation temperature.

BRIEF DESCRIPTION OF THE DRAWINGS

The features and inventive aspects of the present invention will become more apparent upon reading the following detailed description, claims and drawings, of which the following is a brief description:

DETAILED DESCRIPTION OF PREFERRED EMBODIMENTS

Figure 2:
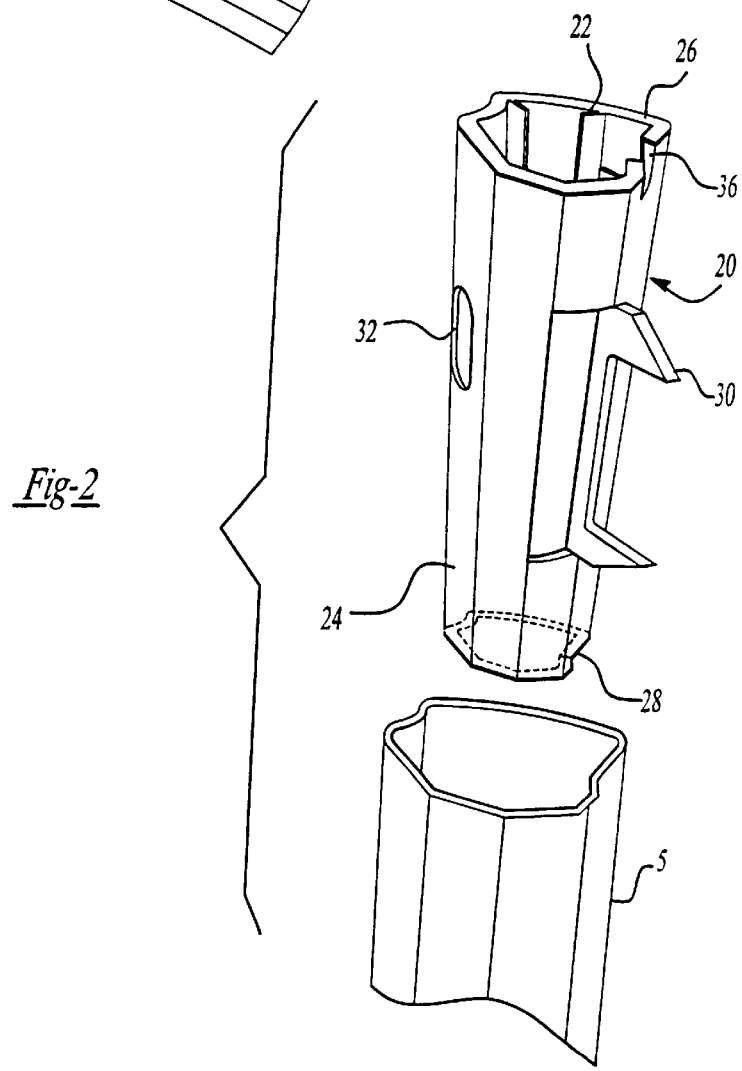
FIG. 2 shows a perspective view of a reinforced sleeve formed in accordance with the teachings of the invention.

FIG. 2 shows a reinforced sleeve 20 formed in accordance with the teachings of this invention. The sleeve 20 includes a carrier 22 and a reinforcing medium 24 supported by the carrier 22.

The carrier 22 is an elongated member having open end portions 26, 28. At the end 26, the carrier 22 includes a U-shaped notch 36 and an elongated opening 32, each of which aligns with mating components on an automobile frame, or alternatively permits venting of the sleeve 20. At the opposite end 28, the carrier 22 defines an opening (not shown), which also aligns with mating components of an automobile frame or alternatively permits venting of sleeve 20. The exterior surface of the carrier 22 supports an outwardly extending C-shaped bracket 30 between the end portions 26, 28.

Figure 3:
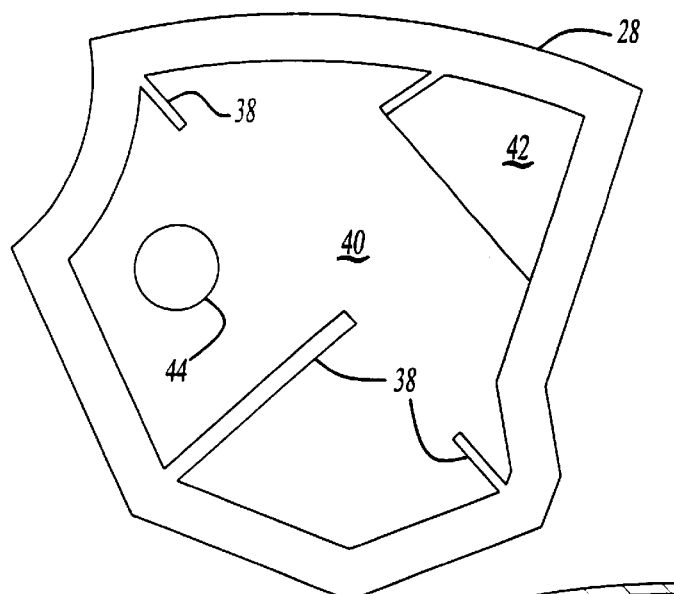
FIG. 3 shows a cross-sectional view of the sleeve of FIG. 2 taken along the line 3—3.

Internally, the carrier 22 is reinforced by an interior plate 40, as best seen in FIG. 3. The plate 40 is located approximately at the center portion of the carrier 22, and includes two openings 42, 44 for permitting the passage of components through the carrier 22. It will be appreciated that the openings 42, 44 may also permit ventilation of the carrier 22 if necessary.

The interior surface of the carrier 22 also supports reinforcing ribs 38. The ribs 38 extend axially along the carrier 20 beginning at each end 26, 28 and extending inwardly toward the plate 40. The ribs 38 terminate at the respective sides of the plate 40.

Preferably, the carrier 22 is fabricated of a moldable material. A preferred polymeric material is glass-reinforced nylon. The carrier 22 can be formed using known techniques such as injection molding, insert injection molding, die casting or blow molding. One advantage of the carrier 22 being fabricated of a moldable material is the ability to mold the carrier 22 into a variety of configurations. Specifically, the carrier 22 can be fabricated using a mold having virtually the same configuration as the component to which the carrier 22 will be coupled or inserted. This facilitates assembling the carrier 22 with the mating component without the need for mechanical fasteners or welding.

Figure 4:
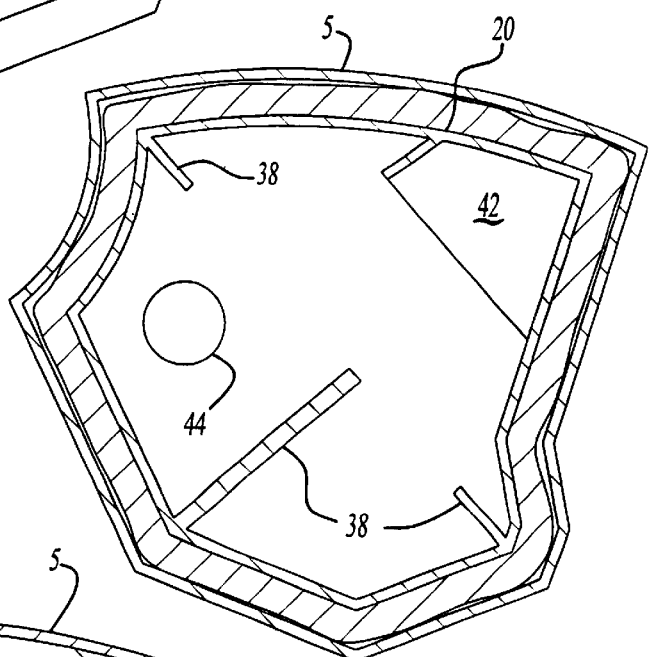
FIG. 4 shows the sleeve of FIG. 2 in the uncured state installed in an automobile frame at the B-pillar portion of the frame.
Figure 5:
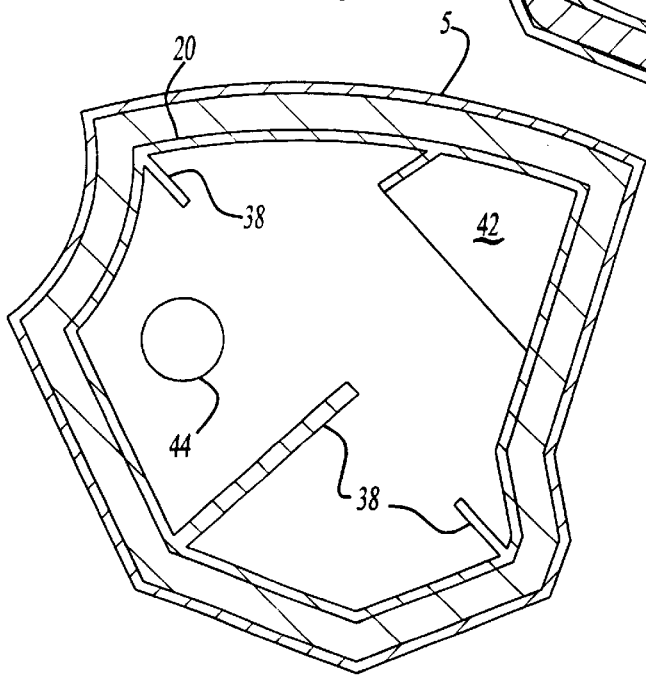
FIG. 5 shows a cross-section view of the sleeve of FIG. 2 in the cured state installed in an automobile frame at the B-pillar portion of the frame.

Turning now to a discussion of the reinforcing medium 24, as seen in FIGS. 2, 4 and 5, the carrier 22 supports the reinforcing medium 24 along at least a portion of its exterior surface. The primary purpose of the reinforcing medium 24 is to increase the structural strength and stiffness of the sleeve 20. In the preferred embodiment, the reinforcing medium 24 is a structural foam. The structural foam 24 increases the compressive strength and structural stiffness of the sleeve 20 without adding significantly to the overall weight of the sleeve 20.

Typically, the structural foam 24 is applied to the carrier 22 in the areas where bonding contact and load transfer is needed. It will be appreciated that the structural foam 24 may encapsulate the entire carrier 22 or may be applied only at preselected locations. The structural foam 24 substantially covers the entire carrier 22 shown in FIG. 2. Note, however, that it is not necessary to substantially cover the entire surface of the carrier 22 in all applications in which the sleeve will be used. Instead, the structural foam 24 can be applied to selected areas on the carrier 22, leaving other portions of the carrier 22 uncoated. In the example shown in FIG. 2, only the end portions 26, 28 and the area of the C-shaped bracket 30 remain uncoated.

The structural foam 24 is generally applied to the carrier 22 in a solid or semi-solid state. The structural foam 24 is applied to the outer perimeter of the carrier 22 in a semi-solid state using commonly known injection techniques. During the application process, the structural foam 24 is heated to a temperature that permits the structural foam 24 to flow slightly. However, the temperature is not sufficient to cause the foam 24 to expand or cure. Upon cooling, the structural foam 24 hardens and adheres to the outer surface of the carrier 22. Where the carrier 22 is made of polymer, for example, it is possible to inject the structural foam 24 into the mold for the carrier 22 during the process of molding the carrier 22. This arrangement permits the structural foam 24 to substantially encapsulate the outer periphery of the carrier 22.

Alternatively, the structural foam 24 may be applied to the carrier 22 as precast pellets, which are heated slightly to permit the pellets to bond to the outer surface of the carrier 22. At this stage, the structural foam 24 is heated just enough to cause the structural foam 22 to flow slightly, but not enough to cause the structural foam 24 to thermally expand. Note that other expandable materials can be used, such as, without limitation, an encapsulated mixture of materials that, when activated by temperature, pressure, chemically, or by other ambient conditions, will expand.

The structural foam 24 is an epoxy-based material that may include an ethylene copolymer or terpolymer. A copolymer or terpolymer, is composed of two or three different monomers, respectively, i.e., small molecules with high chemical reactivity that are capable of linking up with similar molecules to create a polymer.

A number of epoxy-based structural reinforcing foams are known in the art and may also be used as the structural foam 24. A typical structural foam includes a polymeric base material, such as an epoxy resin or ethylene-based polymer which, when compounded with appropriate ingredients (typically a blowing agent, filler, curing agent, etc.), expands and cures in a reliable and predicable manner upon the application of heat or another activation stimulus. The resulting material has a density that is sufficient to impart desired rigidity to a supported article. From a chemical standpoint for a thermally-activated material, the structural foam 24 is usually initially processed as a thermoplastic material before curing. After curing, the structural foam 16 typically becomes a thermoset material.

An example of a preferred structural foam 24 formulation is an epoxy-based material that may include an ethylene copolymer or terpolymer commercially available from L&L Products of Romeo, Mich. under the designations L5206, L5207, L5208 and L5209. One advantage of the preferred structural foam materials 24 over prior art materials is that the preferred materials can be processed in several ways. The preferred materials can be processed by injection molding, extrusion or with a mini-applicator type extruder. This enables the formulation and creation of part designs that exceed the capability of most prior art materials.

While the preferred materials for fabricating the structural foam 24 have been disclosed, the structural foam 24 can be formed from other materials provided that the material selected is heat-activated or otherwise activated by an ambient condition (e.g. moisture, pressure, time or the like) and expands in a predictable and reliable manner under appropriate conditions for the selected application. One such material is the epoxy based resin disclosed in U.S. patent application Ser. No. 09/460,322, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. In general, the desired characteristics of the structural foam 24 include high stiffness, high strength, high glass transition temperature (typically greater than 70 degrees Celsius), and good corrosion resistance properties.

In applications where a heat activated, thermally expanding material is employed, an important consideration involved with the selection and formulation of the material comprising the structural foam 24 is the temperature at which a material reaction or expansion, and possibly curing, will take place. For instance, in most applications, it is undesirable for the material to be active at room temperature or otherwise at the ambient temperature in a production line environment. More typically, the structural foam 24 becomes reactive at higher processing temperatures, such as those encountered in an automobile assembly plant, when the foam 16 is processed along with the automobile components at elevated temperatures or at higher applied energy levels. While temperatures encountered in an automobile assembly operation may be in the range of 148.89° C. to 204.44° C. (300° F. to 400° F.), body and paint shop applications are commonly about 121° C. (250° F.) or slightly lower. If needed, blowing agents can be altered by activation to cause expansion at different temperatures outside the above ranges.

Generally, prior art expandable foams have a range of expansion ranging from approximately 0 to over 1000 percent. The level of expansion of the structural foam 24 may be increased to as high as 1500 percent or more.

INSTALLATION

Figure 1:
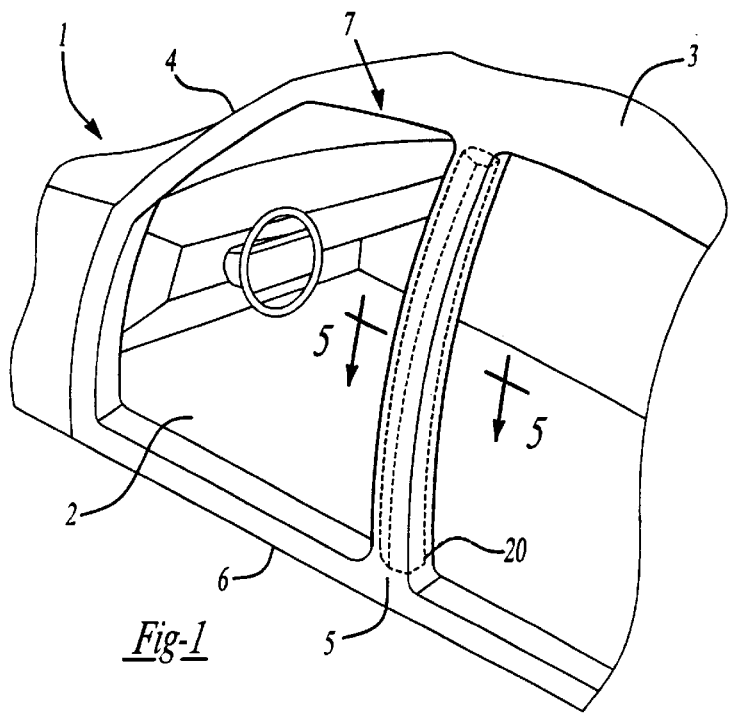
FIG. 1 is an elevational view of a typical automobile frame assembly.

FIG. 1 shows an automobile 1 having a front door aperture 2, a roof portion 3, an A-pillar 4 and a B-pillar 5. The front door aperture 2 is bounded in the longitudinal direction of the vehicle by the front or A-pillar 4, and the rear or B-pillar 5. At the bottom, the door aperture 2 is bounded by a sill 6, and at the top by the roof portion 3. The A-pillar 4, B-pillar 5, roof portion 2 and the sill 6 form a frame 7 that surrounds the passenger compartment, which is internally adjacent the door aperture 2.

Conventionally, the pillars 4, 5 are hollow beams having a closed profile. According to the present invention, the hollow center of the pillars 4, 5 each receive the sleeve 20 as best seen in FIG. 1, 2, 4 and 5. The sleeve 20 is configured such that the C-bracket 30, the opening 32 as well as other openings not shown in the figures and the U-shaped portion 36 align with mating components formed or supported by the pillars 4, 5.

As seen in FIG. 4, when the sleeve 20 is installed in the pillar 5, there is a slight clearance between the interior of the B-pillar 5 and the sleeve 20. This is so because the structural foam 24 is in the uncured state and enables the structural foam 24 to bond to electrocoat-primed metal rather than non-primed metal. More particularly, the clearance permits electrocoat drainage, thereby allowing the primer to cover all of the metal surfaces to facilitate bonding of the structural foam and prevent corrosion of the metal.

FIG. 5 illustrates the position of the structural foam 24 in the automobile frame assembly after the curing cycle. As shown, the structural foam 24 adheres to the inner surface of the automobile frame assembly, substantially filling the gap between the inner surface of the pillar 5 and the sleeve 20.

The structural foam 24 is fully cured by subjecting the structural foam 24 to temperatures in the range of those generated by a paint oven of the type used to cure automobile body paint or primer. It will be appreciated that paint ovens are known to reach temperatures of 121° C. (250° F.) or greater. Thus, it will be appreciated that the structural foam may be cured by simply heating the sleeve to a temperature of 121° C. (250° F.) or greater.

The high temperatures used to cure the structural foam 24 also cause activation of the thermal expansion properties of the structural foam 24. The application of the structural foam 24 to the carrier 22 increases the structural strength and stiffness of the carrier 22. As a result, the overall structural strength and stiffness of the sleeve 20 is increased.

It should be understood that various alternatives to the embodiments of the invention described herein may be employed in practicing the invention. It is intended that the following claims define the scope of the invention and that the method and apparatus within the scope of these claims and their equivalents be covered thereby.

I claim:

1. A reinforced automobile pillar, comprising:
   an elongated hollow beam;
   a sleeve received in the hollow beam, the sleeve including an elongated carrier asymmetrical about its longitudinal axis and having at least one opening adapted for passage of components therethrough, and an exterior surface having at least one outwardly extending bracket; and
   a reinforcing medium supported by the carrier, wherein the reinforcing medium extends along at least a portion of the length of the carrier.

2. The reinforced automobile pillar defined in claim 1, wherein the carrier is a polymer composite.

3. The reinforced sleeve as defined in claim 2, wherein the polymer composite is one selected from the group consisting of sheet molding compound, fiber reinforced polymer, and mineral reinforced polymer.

4. The reinforced automobile pillar defined in claim 1, wherein the reinforcing medium is an epoxy-based resin.

5. The reinforced automobile pillar defined in claim 4, wherein the reinforcing medium is L5206 structural foam commercially available from L&L Products of Romeo, Mich.

6. The reinforced automobile pillar defined in claim 4, wherein the reinforcing medium is L5207 structural foam commercially available from L&L Products of Romeo, Mich.

7. The reinforced automobile pillar defined in claim 4, wherein the reinforcing medium is L5208 structural foam commercially available from L&L Products of Romeo, Mich.

8. The reinforced automobile pillar defined in claim 4, wherein the reinforcing medium is L5209 structural foam commercially available from L&L Products of Romeo, Mich.

9. The reinforced automobile pillar defined in claim 1, wherein the carrier has an offset portion that creates a clearance between the sleeve and a surface of the hollow beam.

10. The reinforced sleeve as claimed in claim 1, wherein said reinforcing medium is an epoxy-based polymer having foamable characteristics.

11. A reinforced automobile pillar, comprising:
    an elongated hollow beam;
    a sleeve received in the hollow beam, the sleeve including an elongated rigid carrier asymmetrical about its longitudinal axis and having an interior and exterior surface, said exterior surface having at least one outwardly extending bracket; and
    a reinforcing medium supported by the carrier, wherein the reinforcing medium extends along at least a portion of the length of the carrier.

12. The reinforced automobile pillar defined in claim 11, wherein the carrier is a polymer composite.

13. The reinforced sleeve as defined in claim 12, wherein the polymer composite is one selected from the group consisting of sheet molding compound, fiber reinforced polymer, and mineral reinforced polymer.

14. The reinforced automobile pillar defined in claim 11, wherein the reinforcing medium is an epoxy-based resin.

15. The reinforced automobile pillar defined in claim 11, wherein the carrier has an offset portion that creates a clearance between the sleeve and a surface of the hollow beam.

16. The reinforced sleeve as claimed in claim 11, wherein said reinforcing medium is an epoxy-based polymer having foamable characteristics.

17. The reinforced sleeve as claimed in claim 11, wherein said reinforcing medium is a heat activated expandable polymer foam.

18. The reinforced sleeve as claimed in claim 11, wherein said reinforcing medium is an expandable plastic material having foamable characteristics that can be activated at a temperature encountered in an automotive vehicle paint operation.

19. The reinforced automobile pillar defined in claim 11, wherein the reinforcing medium is L5206 structural foam commercially available from L&L Products of Romeo, Mich.

20. The reinforced automobile pillar defined in claim 11, wherein the reinforcing medium is L5207 structural foam commercially available from L&L Products of Romeo, Mich.

* * * * *

UNITED STATES PATENT AND TRADEMARK OFFICE
CERTIFICATE OF CORRECTION

PATENT NO. : 6,474,723 B2
DATED : November 5, 2002
INVENTOR(S) : Michael J. Czaplicki, Eric Le Gall and Berndt Eckman It is certified that error appears in the above-identified patent and that said Letters Patent is hereby corrected as shown below:

<u>Title page,</u>
Item [56], References Cited, FOREIGN PATENT DOCUMENTS,
add -- DE 4028895 C1 --.
Replace "EP 0 893 322 B1" with -- EP 0 893 332 B1 --.

Signed and Sealed this

Eighteenth Day of February, 2003

JAMES E. ROGAN
*Director of the United States Patent and Trademark Office*